(12) United States Patent  (10) Patent No.:  US 6,213,333 B1
Icard  (45) Date of Patent:  Apr. 10, 2001

(54) UTENSIL TRAY AND METHOD

(76) Inventor: Johnny J. Icard, 6943 Rhodhiss Rd., Connelly Springs, NC (US) 28612

( * ) Notice: Subject to any disclaimer, the term of this patent is extended or adjusted under 35 U.S.C. 154(b) by 0 days.

(21) Appl. No.: 09/244,821

(22) Filed: Feb. 4, 1999

(51) Int. Cl.[7] .................................................. B65D 25/24
(52) U.S. Cl. .......................................... 220/482; 220/480
(58) Field of Search ..................................... 220/482, 480, 220/476, 507, 553, 555

(56) References Cited

U.S. PATENT DOCUMENTS

| | | | |
|---|---|---|---|
| D. 337,938 | * 8/1993 | Shaw et al. ............................ | D8/380 |
| 2,831,598 | * 4/1958 | Slavsky ................................. | 220/482 |
| 3,946,522 | * 3/1976 | Schifman ................................ | 47/36 |
| 4,048,754 | * 9/1977 | Laux ....................................... | 47/68 |
| 4,748,770 | * 6/1988 | Cline ...................................... | 47/68 |
| 4,897,958 | * 2/1990 | Brydges .................................. | 47/68 |
| 4,927,021 | * 5/1990 | Taylor .................................... | 206/373 |
| 5,297,674 | * 3/1994 | Birutis et al. ......................... | 206/214 |
| 5,531,238 | * 7/1996 | Azzarelli et al. ...................... | 135/66 |
| 5,857,583 | * 1/1999 | Chantaca et al. ..................... | 220/555 |
| 5,924,615 | * 7/1999 | McGarrah ............................. | 220/482 |

* cited by examiner

Primary Examiner—Stephen Castellano

(57) ABSTRACT

A utensil tray comprises a planar elongated member which hangs from a window sill by a pair of brackets and is supported by a pair of threaded members to adjustably position the tray relative to the interior surface of the wall. The tray comprises two containers, one of which is generally rectilinear and the other of which is an irregular hexagon. A method of hanging and using the tray comprises hanging the tray over a window sill proximate a sink and manipulating the faucet handle without interference.

6 Claims, 5 Drawing Sheets

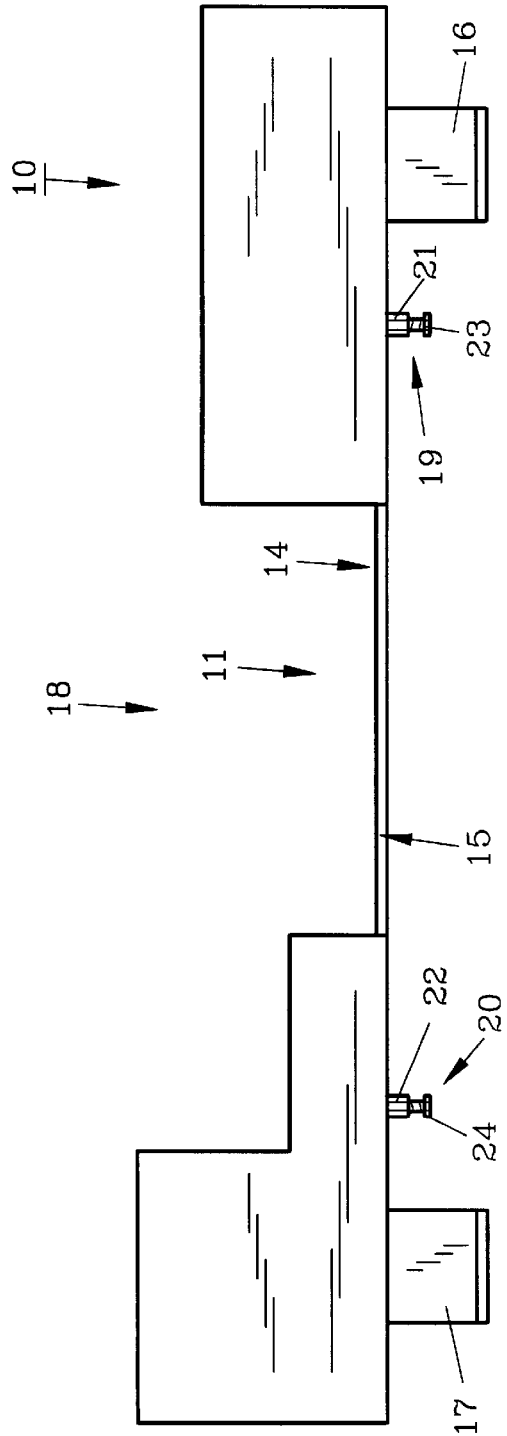
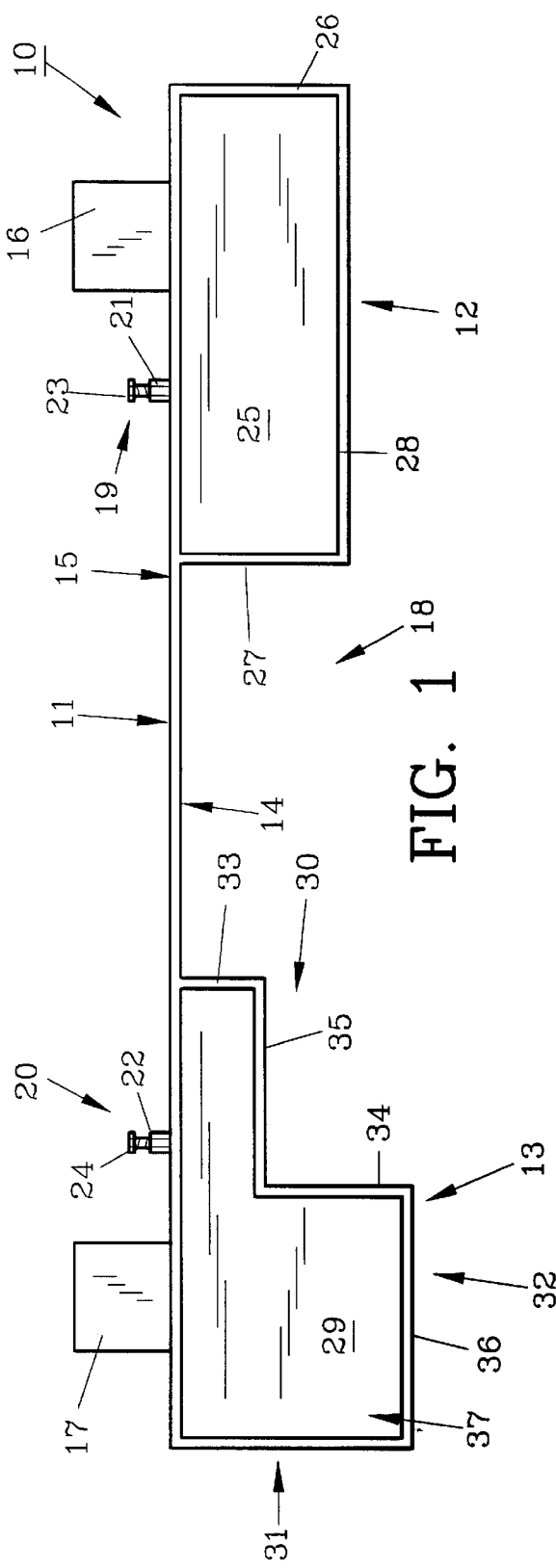
FIG. 6
FIG. 1

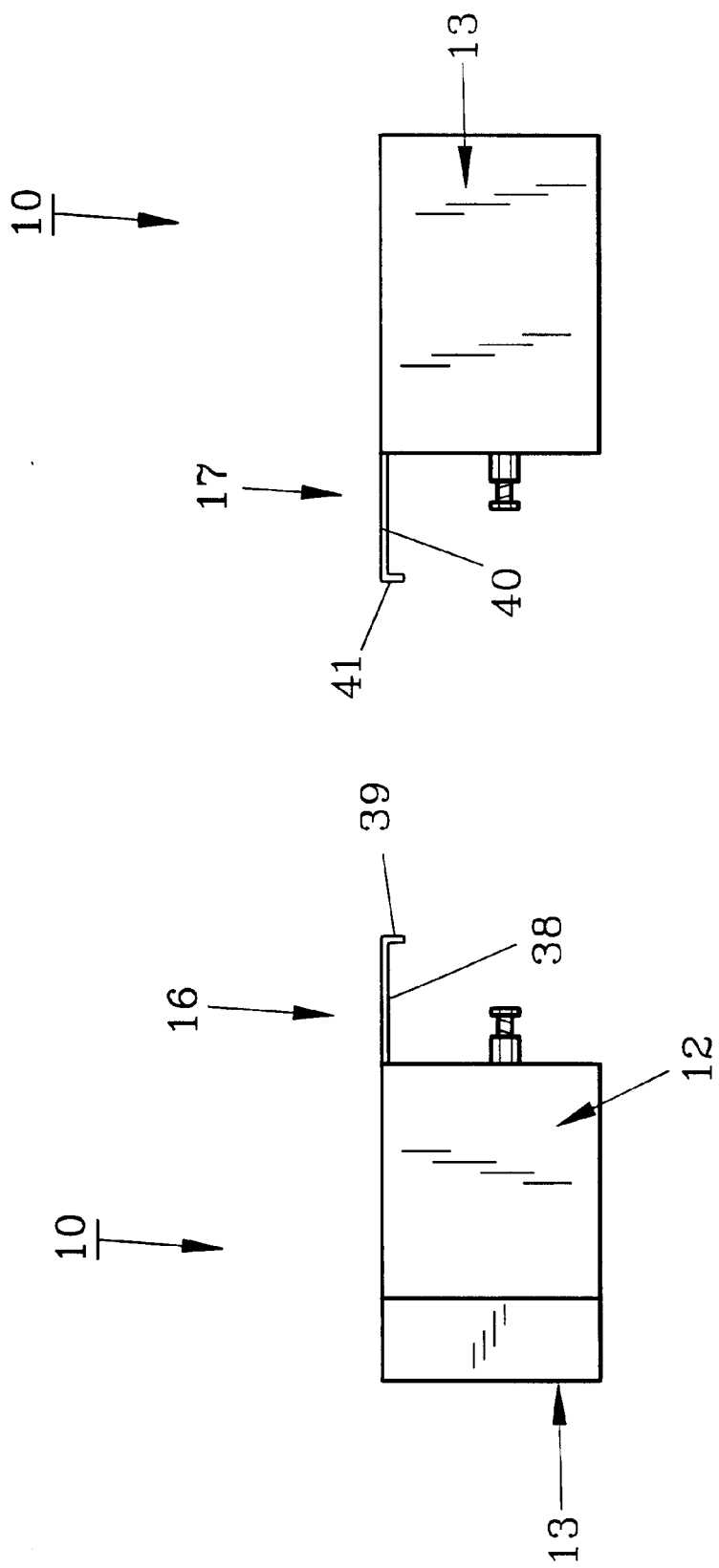

UTENSIL TRAY AND METHOD

BACKGROUND OF THE INVENTION

1. Field of the Invention

This invention pertains to a tray designed to hold utensils proximate a window, such as over a kitchen sink.

2. Description of The Prior Art And Objectives Of The Invention

Frequently kitchens are designed so that the user of the sink may look through a window as a reward for enduring the drudgery of washing dishes or the like. Unfortunately, most sinks do not have convenient receptacles for a number of utensils proximate the sink. Such utensils may include, but are not limited to sponges, steel wool, towels or more conventional utensils like forks, knives and spoons.

While window boxes for flowers and the like do exist as seen in U.S. Pat. Nos. 3,946,522; 4,748,770; 4,897,958; and Des. 337,938, these devices are not designed to function interiorly over a sink, and may interfere with the operation of the faucet handle. Thus, there remains a need for, and it is an objective of the present invention to provide, an interiorly mounted utensil tray which is adapted to fit over a sink and accommodate the faucet handle.

It is a further objective of the present invention to provide a multi-compartment utensil tray which may be positioned proximate the sink for the storage of utensils therein.

It is still a further objective of the present invention to provide a utensil tray with a means for leveling spacing the utensil tray from the interior surface of the wall.

It is yet a further objective of the present invention to provide a method of storing utensils proximate a sink.

These and other objectives and advantages will become readily apparent to those skilled in the art upon reference to the following detailed description and accompanying drawing figures.

SUMMARY OF THE INVENTION

The aforedescribed objectives and advantages are realized by providing a planar elongated member to which is affixed a pair of containers, a pair of brackets and a pair of supports. The containers are on the opposite side of the planar member from the brackets and supports. The containers are preferably spaced one from the other to allow a faucet handle to be manipulated therebetween without interfering with the motion of the handle. The supports are preferably threaded members which allow the length of the support to be infinitely, selectively changed to accommodate differently sized window sills or the like. In the preferred embodiment, one container is irregularly shaped, yet still generally rectilinear and the second container is rectilinearly shaped.

The method of use comprises positioning a tray of the above described characteristics on the interior ledge of the window sill, by hanging the brackets over the interior sill, and adjusting the supports so that the tray hangs properly. Utensils are then placed in the containers and used as needed. Furthermore, the faucet handle is then manipulated between the containers without interference from the tray of the present invention.

BRIEF DESCRIPTION OF THE DRAWINGS

FIG. 1 shows a top plan view of the preferred embodiment of the present invention;

FIG. 2 illustrates a right side elevational view of the tray of FIG. 1;

FIG. 3 demonstrates a left side elevational view of the tray of FIG. 1;

FIG. 6 depicts a bottom plan view of the tray of FIG. 1;

DETAILED DESCRIPTION OF THE PREFERRED EMBODIMENT AND OPERATION OF THE INVENTION

Figure 4:
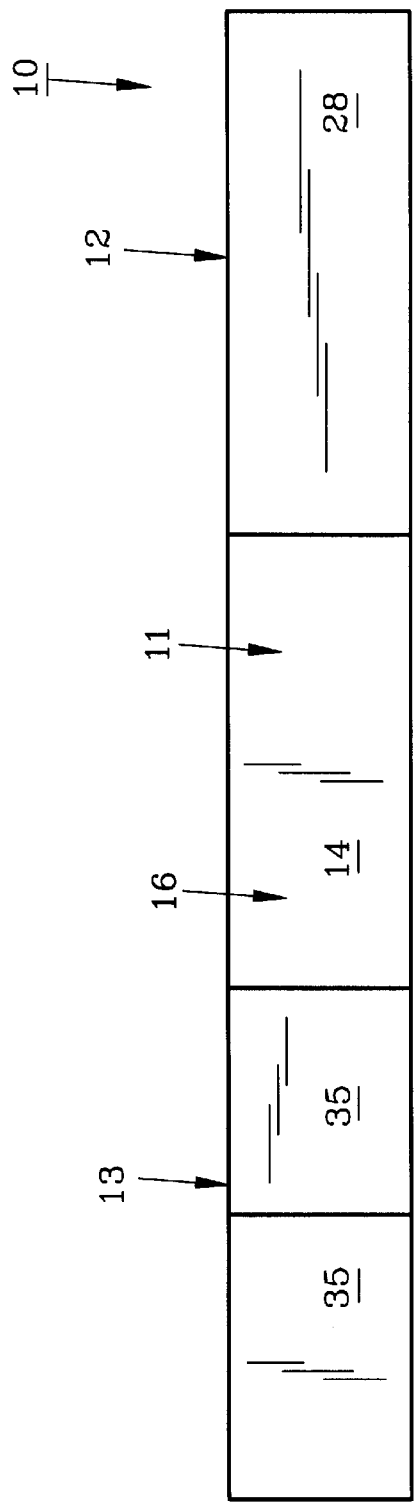
FIG. 4 features a front elevational view of the tray of FIG. 1.
Figure 5:
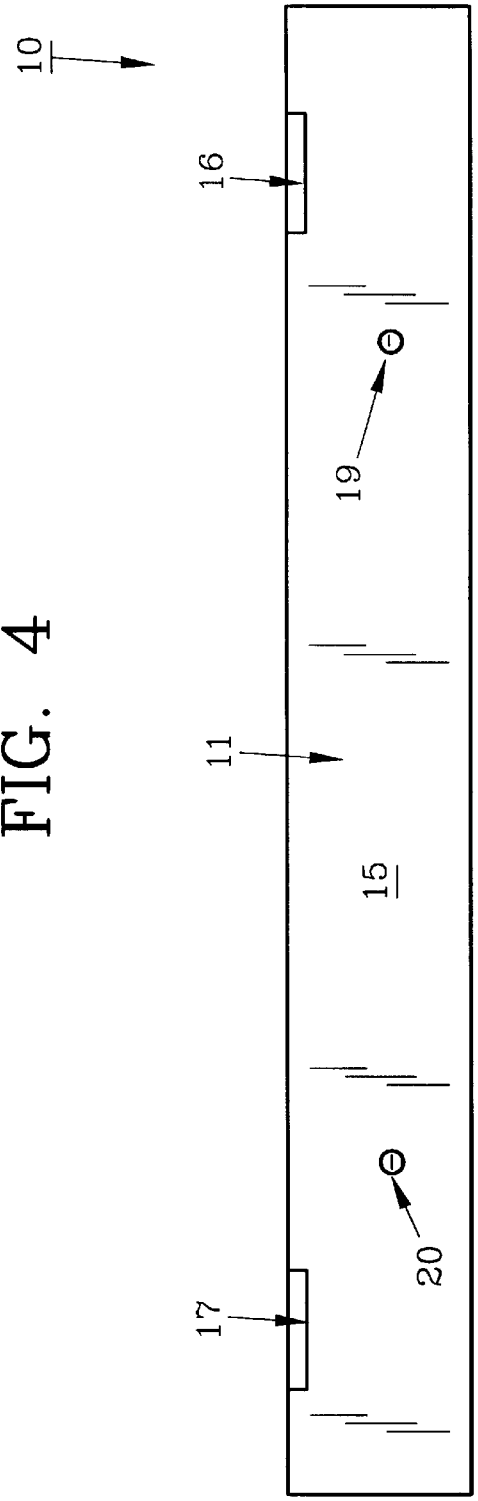
FIG. 5 pictures a back elevational view of the tray of FIG. 1.

Turning now to the drawings, specifically FIGS. 1–6 show preferred tray 10 in isolation. Tray 10 comprises elongated planar member 11 (FIGS. 1, 4 and 5) and the entirety of tray 10 is preferably comprised of a unitary rigid plastic, although metal, wood or other rigid material may also be used. Attached thereto are first and second containers 12 and 13 which extend forwardly from front surface 14 of planar member 11. First container 12 is generally rectilinear and extends the height of planar member 11 (FIG. 4). Second container 13 is an irregularly shaped hexagon and extends further forwardly from planar member 11 than first container 12. Second container 13 also extends the height of planar member 11 and is spaced from first container 12 by faucet channel 18. Attached to back surface 15 of planar member 11 are first and second brackets 16 and 17 which are spaced one from the other and are generally L-shaped (FIGS. 2 and 3). Also extending from back surface 15 are supports 19 and 20, which are preferably threaded members received by threaded channels 21 and 22 respectively. Supports 19 and 20 include planar heads 23 and 24 respectively which when tray 10 is in use abut the wall surface and hold tray 10 in the desired position. The distance from back surface 15 to planar heads 23 and 24 may be infinitely, selectively adjusted by threading supports 19 and 20 into or backing supports 19 and 20 out of threaded channels 21 and 22 respectively.

First container 12, best seen in FIGS. 1 and 2, comprises planar floor 25, side walls 26 and 27 and front wall 28 which form a rectilinear shape. While not shown, drains may be included to drain container 12. Second container 13, best seen in FIGS. 1 and 3, comprises planar floor 29, side walls 30 and 31 and front wall 32. Side wall 31 is divided into first section 33 and second section 34 while front wall 32 is divided into first section 35 and second section 36. This creates larger portion 37 of second container 12 thereby allowing larger utensils (not shown) to be inserted therein.

As seen in FIGS. 2 and 3, brackets 16 and 17 are generally L-shaped and respectively comprise horizontal portions 38, 39 and vertical portions 40 and 41. While not shown, brackets 16 and 17 may comprise conventionally expandable members such a telescoping sleeve and shaft arrangement or a pin and aperture arrangement to allow brackets 16 and 17 to fit over differently sized window sills.

Figure 7:
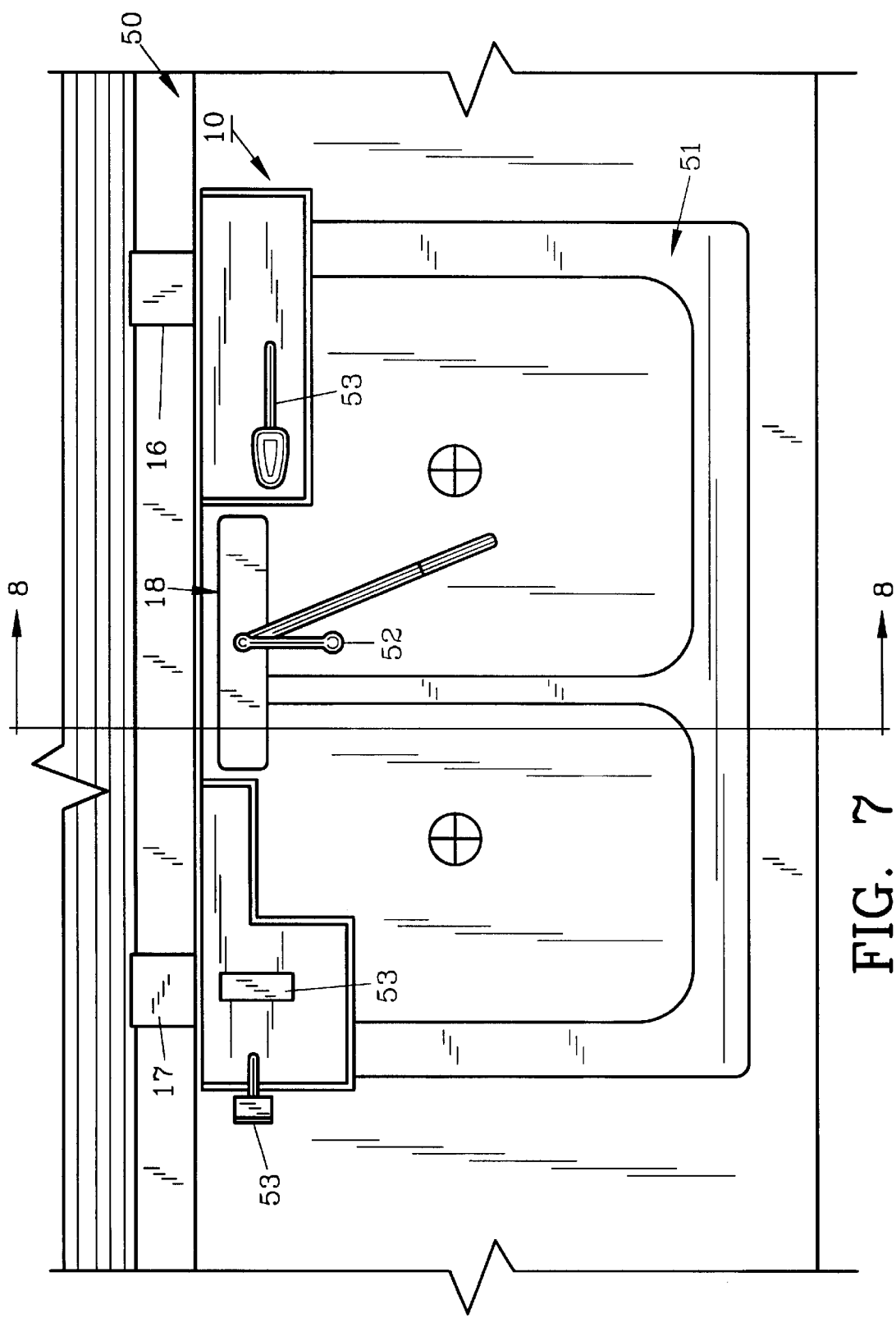
FIG. 7 represents a top schematic environmental view of the tray of FIG. 1 positioned over a sink.
Figure 8:
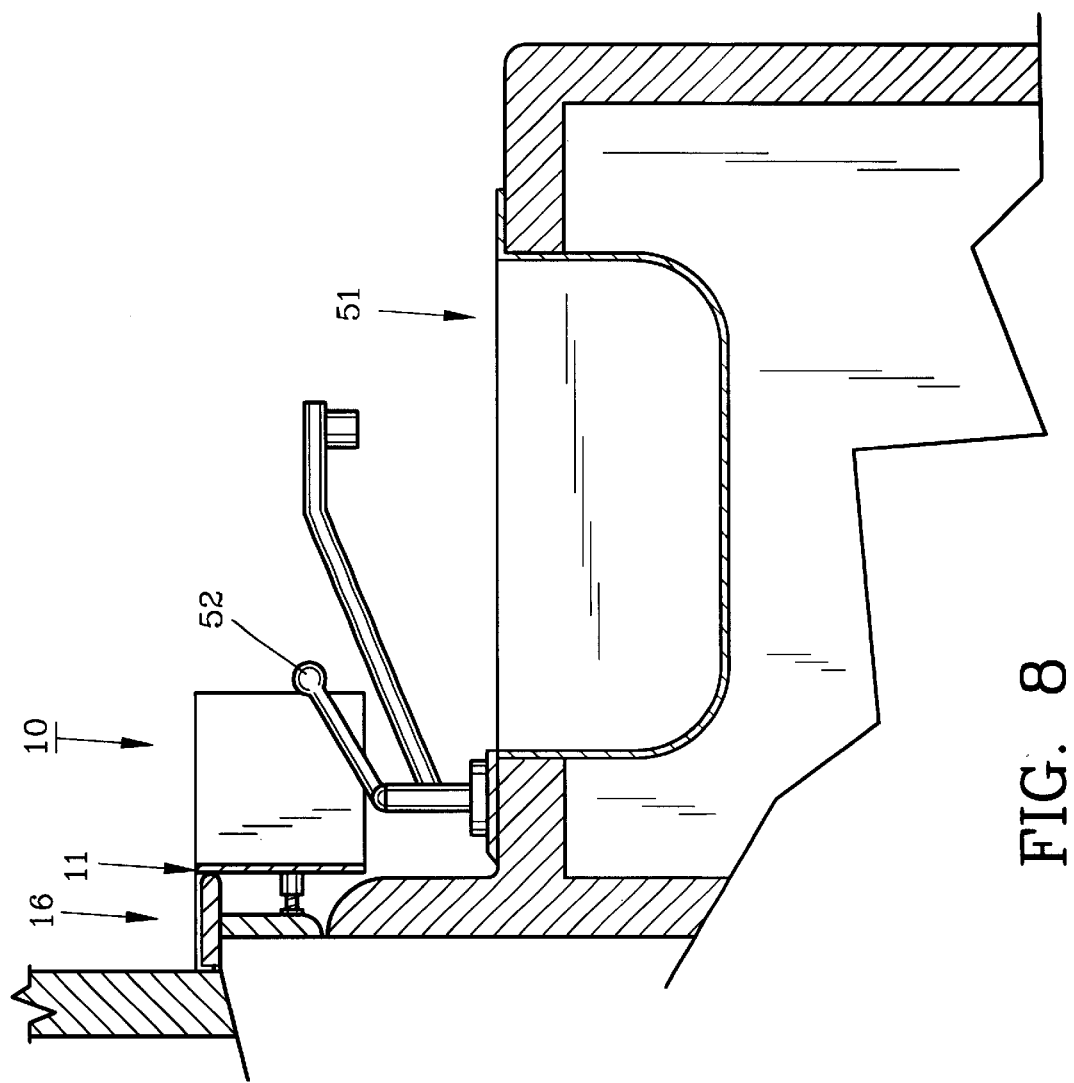
FIG. 8 shows a cross-sectional view of the tray and sink taken along lines 8—8 of FIG. 7.

As seen in FIGS. 7 and 8, brackets 16 and 17 of tray 10 are preferably placed over sill 50 of a conventional window over sink 51. Faucet handle 52 may be raised within faucet channel 18 without interfering with the motion of handle 51. The proximity of tray 10 to sink 51 makes it convenient to store and use utensils 53 positioned within containers 11 or 12 while working at sink 51.

The method of using tray 10 comprises positioning brackets 16 and 17 over sill 50 of a window, thereby hanging tray 10 from said window. Supports 19 and 20 are adjusted within threaded channels 21 and 22 respectively causing planar heads 23 and 24 to abut interior wall surface 55 and to insure that tray 10 hangs properly, preferably vertically, although certain users may prefer an angle imparted to tray 10, and this too is possible with adjustable supports 19 and 20. In the event that brackets 16 and 17 do not fit over sill 50, brackets 16 and 17 may be expanded (not shown) as needed to fit thereover. After proper positioning of tray 10 on sill 50, utensils 53 are placed in either container 11 or 12 or both as needed. Faucet handle 52 is then raised and lowered, turned to hot or cold as needed within faucet handle channel 18 without interfering with handle 52's motion. Utensils 53 may be selectively removed as needed as well.

The preceding recitation is provided as an example of the preferred embodiment and is not meant to limit the nature of scope of the present invention or appended claims.

I claim:

1. In combination, a window, a sink and a utensil tray, said window comprising a sill;

said sink comprising a faucet handle, said sink positioned beneath said window;

said utensil tray comprising:
   a) a planar member, said planar member having a back surface;
   b) a first container, said first container contiguous said planar member;
   c) a second container, said second container contiguous said planar member and spaced from said first container to form a faucet handle channel therebetween;
   d) a support, a threaded channel, said support engaging said threaded channel, said threaded channel positioned on said back surface of said planar member, said support for engagement with a wall; and
   e) a bracket, said bracket positioned on said planar member for engagement with said sill, whereby said tray hangs from said sill, said bracket spaced separate from and laterally along said planar member from said support.

2. The combination of claim 1 wherein said support of said tray comprises a threaded member.

3. The combination of claim 2 wherein said threaded member comprises a planar head.

4. The combination of claim 1 wherein said first container of said tray is rectilinear.

5. The combination of claim 1 wherein said second container of said tray is an irregular hexagon.

6. The combination of claim 1 wherein said tray further comprises a second bracket, said second bracket attached to said planar member and spaced from said first bracket.

\* \* \* \* \*